United States Patent
Jung (10) Patent No.: US 11,452,909 B2
(45) Date of Patent: Sep. 27, 2022

(54) TRAINING EQUIPMENT TO IMPROVE THE ABILITY OF COGNITION AND MEMORY AND THE MUSCLE POWER OF UPPER AND LOWER LIMB AND TRAINING METHOD THEREOF

(71) Applicant: MAN & TEL Co., Ltd., Gumi-si (KR)

(72) Inventor: Kwang Wook Jung, Gumi-si (KR)

(73) Assignee: MAN & TEL Co., Ltd., Gumi-si (KR)

( * ) Notice: Subject to any disclaimer, the term of this patent is extended or adjusted under 35 U.S.C. 154(b) by 32 days.

(21) Appl. No.: 16/679,848

(22) Filed: Nov. 11, 2019

(65) Prior Publication Data

US 2020/0206567 A1 Jul. 2, 2020

(30) Foreign Application Priority Data

Dec. 27, 2018 (KR) .......... 10-2018-0170264

(51) Int. Cl.
*A63B 23/04* (2006.01)
*A63B 22/06* (2006.01)
(Continued)

(52) U.S. Cl.
CPC ...... *A63B 23/0476* (2013.01); *A63B 22/0605* (2013.01); *A63B 24/0087* (2013.01);
(Continued)

(58) Field of Classification Search
USPC ................................................ 434/188, 191
See application file for complete search history.

(56) References Cited

U.S. PATENT DOCUMENTS

2008/0136907 A1* 6/2008 Karikko ............. A63B 24/0006
348/143
2011/0082009 A1* 4/2011 Ranky ................ A63B 71/0622
482/8
(Continued)

FOREIGN PATENT DOCUMENTS

KR 101247487 B1 * 4/2013 ......... A63B 24/0087
KR 10-1498569 B1 3/2015
(Continued)

*Primary Examiner* — Sundhara M Ganesan
*Assistant Examiner* — Shila Jalalzadeh Abyaneh
(74) *Attorney, Agent, or Firm* — Novick, Kim & Lee, PLLC; Jae Youn Kim; Jihun Kim (57) ABSTRACT

The present invention relates to training equipment for improving the ability of memory and cognition, and muscle power, and a training method using the training equipment. In particular, the present invention relates to training equipment for improving the ability of memory and cognition, and muscle power (upper and lower limb muscle power), the training equipment including: a lower limb muscle power exercise module that includes pedals for strengthening the muscle power of user's lower limbs and/or a handle for steering; a display that implements traveling in a virtual space for memory ability training of the user; and a training unit that improves cognition ability and/or muscle power of the user on the basis of driving data of the lower limb muscle power exercise module, thereby being able to complexly support memory ability training, lower limb muscle power exercise, and upper limb muscle power exercise of rehabilitation patients, patients with dementia, and/or patients with cognitive impairment.

5 Claims, 4 Drawing Sheets

(51) Int. Cl.
*A63B 24/00* (2006.01)
*A63F 13/213* (2014.01)

(52) U.S. Cl.
CPC .... *A63F 13/213* (2014.09); *A63B 2024/0096* (2013.01); *A63F 2250/1094* (2013.01); *A63F 2300/1087* (2013.01); *A63F 2300/8064* (2013.01)

(56) References Cited

U.S. PATENT DOCUMENTS

| | | | |
|---|---|---|---|
| 2013/0216988 A1* | 8/2013 | You | G09B 19/003 434/236 |
| 2016/0073033 A1* | 3/2016 | Ogasawara | H04N 5/2252 348/207.1 |
| 2016/0300390 A1* | 10/2016 | Malafeew | A63F 13/525 |
| 2018/0290017 A1* | 10/2018 | Fung | A63F 13/214 |

FOREIGN PATENT DOCUMENTS

| | | | | |
|---|---|---|---|---|
| KR | 10-2015-0121753 A | | 10/2015 | |
| KR | 101723404 B1 | * | 4/2017 | ......... A63B 24/0062 |
| WO | WO-2012161542 A2 | * | 11/2012 | ......... A63B 22/0605 |

* cited by examiner

TRAINING EQUIPMENT TO IMPROVE THE ABILITY OF COGNITION AND MEMORY AND THE MUSCLE POWER OF UPPER AND LOWER LIMB AND TRAINING METHOD THEREOF

BACKGROUND OF THE INVENTION

Field of the Invention

The present invention relates to training equipment for improving the ability of cognition, memory, and muscle power, the training equipment being able to be used in medical devices for exercise for old people or for treatment of rehabilitation patients requiring rehabilitation of a body and/or recovery of memory and used for prevention of diseases, and a training method using the training equipment. More particularly, the present invention relates to training equipment for improving the ability of cognition, memory, and muscle power, the training equipment being able to be complexly used for lower limb exercise, cognition ability training, and upper limb exercise that can be used for improving the muscle power of lower limbs and memory ability training, and a training method using the training equipment.

Description of the Related Art

In general, old people over 65 years old intensively require training for strengthening the muscle power of lower limbs and upper limbs to prevent falling, and memory ability training and cognition improvement training to prevent and delay dementia. Further, patients with hemiplegic paralysis of upper and lower limbs and upper limbs due to a disease such as a stroke intensively require training for improving the muscle power of the lower and upper limbs for rehabilitation.

Patients can recover some of their activities through rehabilitation. Rehabilitation, in the medical field, means application and effect of a means for minimizing a physical result, a mental result, and a social result due to obstacles or limitations to activities and interference with participation in a society.

Recently, as senior citizens rapidly increase, patients with dementia increase, and seniors who receive benefits of care insurance due to falling, etc. increase, the increase of government-created fund is prevented. Thus, it is intensively required to develop and popularize the equipment described above in terms of improving welfare for old people.

The present technology relates to development of complex training equipment that can improve the muscle power of lower and upper limbs and is required for cognition improvement training and prevention and delay of dementia for old people, etc.

CITATION LIST

Patent Literature

Patent Literature 1: Korean Patent No. 10-1498569
Patent Literature 2: Korean Patent Application Publication No. 10-2015-0121753

SUMMARY OF THE INVENTION

The present invention has been made in an effort to solve the problems and an object of the present invention is to provide training equipment that enables patients with weak muscle power of lower limbs or with dementia or old people to strengthen the muscle power of the lower limbs while riding a bicycle (or an exercise apparatus where they can sit and pedal to strengthen the muscle power of the lower limbs), and at the same time, to perform memory ability training by selecting places where they have visited (or places where they have lived) and actually going along roads, and to train the arms and the upper body without only mentally performing cognition training, and a training method using the training equipment.

The object of the present invention described above can be achieved by providing training equipment for improving the ability of memory and cognition, and muscle power, the training equipment including: a lower limb muscle power exercise module that includes pedals for strengthening the muscle power of user's lower limbs and/or a handle for steering; a display that implements traveling in a virtual space for memory ability training of the user; and a training unit that improves cognition ability and/or muscle power of the user on the basis of driving data of the lower limb muscle power exercise module, thereby being able to complexly support memory ability training, lower limb muscle power exercise, and upper limb muscle power exercise of rehabilitation patients, patients with dementia, and/or patients with cognitive impairment.

Further, the training equipment further includes a motion sensor that senses motions of the user to improve the muscle power and strengthening cognition ability, in which training equipment can complexly support memory ability training, cognition ability training, lower limb muscle power exercise, and upper limb muscle power exercise of rehabilitation patients, patients with dementia, and/or patients with cognitive impairment.

Further, the training unit includes a memory ability training unit that enables memory ability training by traveling in a virtual space implemented on the display on the basis of the driving data transmitted from the lower limb muscle power exercise module.

Further, the training unit includes a cognition ability training unit that enables strengthening of cognition ability through a calculation game and/or a puzzle game on the basis of motion data for movement of user's hands and/or arms transmitted from the motion sensor such that upper limb muscle power improvement training and cognition ability improvement training of the rehabilitation patients can be simultaneously performed.

Further, the memory ability training unit configures an image such that roads in a virtual space moves forward by receiving a driving signal for the pedals from the lower limb muscle power exercise module, a movement speed of the roads in the virtual space is adjusted in accordance with a rotational speed of the pedals, and the movement direction of the roads in the virtual space is changed in accordance with an operational direction of the handle, so the user can experience as if the user travels along the roads in the virtual space by driving the lower limb muscle power exercise module.

Further, the training unit further includes a communication unit that transmits driving data including the rotational speed of the pedals and/or the operation direction of the handle and motion data for movement of the user's hands and/or arms to the training unit such that lower limb muscle power improvement training and memory ability improvement training are simultaneously performed by traveling along the roads in the virtual space implemented on the display.

Further, the training unit further includes a rehabilitation evaluation unit that evaluates a state of upper limb muscles of the user by sensing a maximum lifting angle of the user's arms through the motion sensor, thereby being able to measure a state of muscle power of the user.

A training method using the training equipment for improving the ability of memory and cognition, and muscle power (upper limb and/or lower limb muscle power) according to an embodiment of the present invention includes: an estimation step of estimating states of muscles of lower limbs and/or upper limbs of a user through the lower limb muscle power exercise module and the motion sensor; a difficulty setting step of setting training difficulty in accordance with a result through the estimation; a virtual space implementation step of implementing a virtual space through the display; a traveling step of traveling along roads in the virtual space by operating the pedals and/or the handle of the lower limb muscle power exercise module; and a rehabilitation evaluation step of examining a rehabilitation state by evaluating a traveling state when traveling along the roads in the virtual space is finished, thereby being able to complexly support memory ability training, lower limb muscle power exercise, and upper limb muscle power exercise of the user.

Further, the traveling step includes: a step of strengthening upper limb muscles and cognition ability through a cognition ability improvement game based on motion data sensed by the motions sensor; and a cognition ability rehabilitation evaluation step of examining a rehabilitation state by evaluating results of cognition ability training and upper limb muscle training of the user through the cognition ability improvement game, thereby being able to complexly support cognition ability training and upper limb muscle power exercise of rehabilitation patients, patients with dementia, and patients with cognitive impairment.

Further, the cognition ability improvement game includes a calculation game and/or a puzzle game, and a method of executing the calculation game includes: finding a number corresponding to a correct answer of calculation displayed in an image and holding the number in the image using an arm; and moving a position of the arm to move the held number to a predetermined position in the image, thereby being able to complexly support cognition ability training and upper limb muscle power exercise of rehabilitation patients, patients with dementia, and patients with cognitive impairment.

DETAILED DESCRIPTION OF THE PREFERRED EMBODIMENTS

Hereinafter, the present invention is described with reference to the accompanying drawings. However, the present invention may be modified in various different ways and is not limited to the embodiments described herein. Further, in the accompanying drawings, components irrelevant to the description will be omitted in order to obviously describe the present invention, and similar reference numerals will be used to describe similar components throughout the specification.

Throughout the specification, when an element is referred to as being "connected with (coupled to, combined with, in contact with)" another element, it may be "directly connected" to the other element and may also be "indirectly connected" to the other element with another element intervening therebetween. Further, unless explicitly described otherwise, "comprising" any components will be understood to imply the inclusion of other components rather than the exclusion of any other components.

Terms used in the present invention are used only in order to describe specific exemplary embodiments rather than limiting the present invention. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

For reference, for the same components as those in the related art among the components of the present invention, the related art described above are referred to and they are not described in detail.

Figure 1:
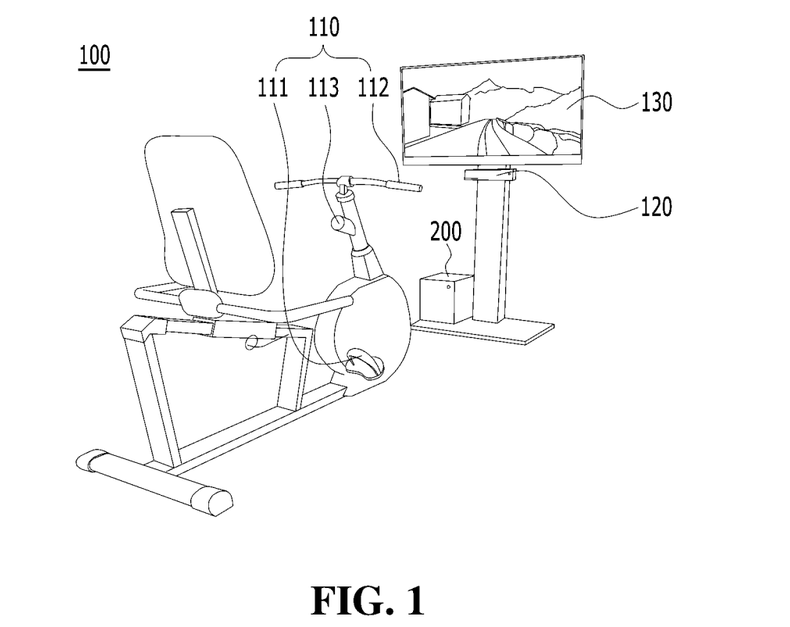
FIG. 1 is a view showing training equipment for improving the ability of memory, cognition, and muscle power according to an embodiment of the present invention.
Figure 2:
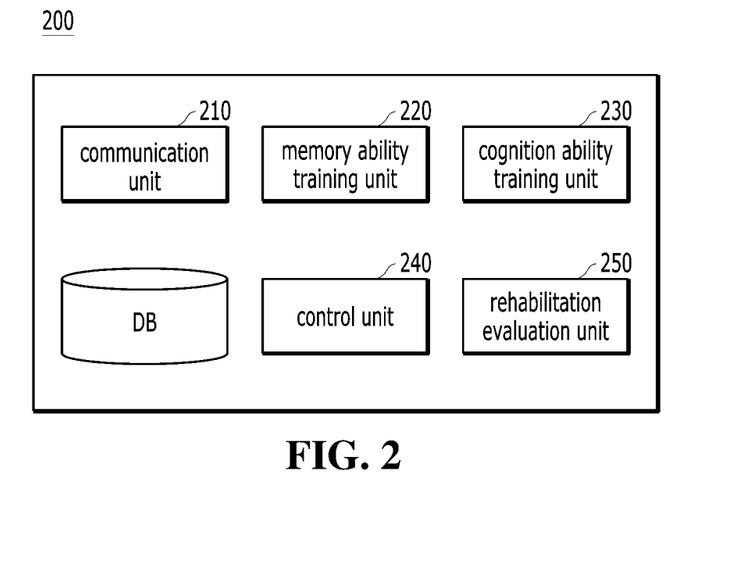
FIG. 2 is a block diagram showing the configuration of a training unit of the training equipment for improving the ability of memory, cognition, and muscle power according to an embodiment of the present invention.

FIG. 1 is a view showing training equipment 100 for improving the ability of memory, cognition, and muscle power according to an embodiment of the present invention, and FIG. 2 is a block diagram showing the configuration of a training unit 200 of the training equipment 100 for improving the ability of memory, cognition, and muscle power (muscle power of upper limbs and/or lower limbs) according to an embodiment of the present invention.

The training equipment 100 for improving the ability of memory, cognition, and muscle power according to the present invention is characterized by being able to improve cognition ability of a user, support exercise of upper limbs, and support evaluation about strengthening muscle power (muscle power of the upper limbs and the lower limbs) of the body of the user including upper limbs through a display 130 that operates (in a wire or wireless type) with a lower limb exercise module 110 (for example, which may be provided as a bicycle or the like) that support improvement of muscle power of lower limbs and memory ability training of the user (a rehabilitation patient, etc.) and a motion sensor 120.

In more detail, the training equipment 100 for improving the ability of memory, cognition, and muscle power according to the present invention relates to a rehabilitation training apparatus for treatment (rehabilitation treatment, etc.) and prevention (of diseases such as dementia) for users of the training equipment 100 according to the present invention such as rehabilitation patients, old people, and/or patients with cognitive impairment. To this end, the training equipment 100 for improving the ability of memory, cognition, and muscle power may include a lower limb muscle power exercise module 110, a motion sensor 120, a display 130, a training unit 200, and a communication unit 210, and can complexly support memory ability training, cognition ability improvement training, and muscle power strengthening (lower limb muscle power and/or upper limb muscle power) of rehabilitation patient, patients with dementia, and patients with cognitive impairment (users).

The lower limb muscle power exercise module 110 according to an embodiment of the present invention, which is a training device for improving the muscle power of lower limbs, may include pedals 111 for strengthening the muscle power of user's lower limbs and/or a handle 112 for steering. For example, the training equipment may be a bicycle that enables a user to strengthen the muscle power of his/her lower limbs by pushing the pedals 111, and may include the handle 112 for steering as if the user is actually riding a bicycle.

Further, the lower limb muscle power exercise module 110 according to an embodiment of the present invention may further include a load adjuster 113 that can control the rotational speed of the pedals 111 of the lower limb muscle power exercise module 110 when training is excessive, depending on the state of muscles (lower limb muscles and/or upper limb muscles) of the user.

The motion sensor 120 according to an embodiment of the present invention can sense motions of the user to improve the muscle power of upper limbs and train cognition ability, and in more detail, can create motion data for movement of the user's hands and/or arms. For example, the motion data can include information about the lifted angles of the user's arms, the positions of the hands, and the speed of the hands moving to a specific position.

The display 130 according to an embodiment of the present invention can implement an actual or virtual space for memory ability training of the user. For example, the actual or virtual space may be implemented by receiving a 3D map corresponding to the address set by the user through the communication unit 210. For example, when the user operates the lower limb muscle power exercise module 110 to strengthen the lower limb muscles, the display 130 can create and provide an actual or virtual map such as Google programs, information and/or image information about a 2D or 3D space, and can display an actual or virtual space (e.g., a sidewalk, a roadway, and/or a street, a residential street, and a shopping quarter with shops, etc.) corresponding to an address set and provided using an existing spatial geometric information system (including an external commercial GPS or a GPS information system) separately from or together with the image information (can implement, play, and/or reproduce actual space information and/or images, or create and implement a virtual space as an image). That is, the display 130 can display images such that the user experiences driving using the lower limb muscle power exercise module 110 in an actual or virtual space corresponding to a set place (the "virtual space" implemented by the display 130 according to the present invention may be an actual space image that is stored in advance or provided from an external spatial geometric information service company, an augmented reality image, a virtual reality image, or a mixed reality image).

Further, the display 130 according to another embodiment of the present invention can execute calculation games or puzzle games for improving cognition ability on the basis of the motion data.

The training unit 200 according to an embodiment of the present invention supports training for improving health of the user on the basis of data of the lower limb muscle power exercise module 110 and the motion sensor 120.

In more detail, the training unit 200 may include a controller 240, a memory ability training unit 220 and a cognition ability training unit 230 that can support improvement of recognition, cognition ability, and/or muscle power of the user on the basis of the data of the lower limb muscle power exercise module 110 and the motion sensor 120.

The memory ability training unit 220 enables strengthening of memory ability through traveling in a virtual reality implemented in the display 130 on the basis of driving data transmitted from the lower limb muscle power exercise module 110. The driving data may include information about the speed of the pedals 111 of the lower limb muscle power exercise module 110 pushed by the user, that is, the rotational speed of the pedals 111, duration of pushing the pedals 111, and the steering direction of the handle 112 and/or information about a total training time. The driving data may be transmitted to the memory ability training unit 220 through the communication unit 210, and the memory ability training unit 220 may create training result data by measuring the total traveling distance, the average speed, the traveling time, etc. on the basis of the driving data.

In more detail, the memory ability training unit 220 can display an image of traveling in a direction and at a speed of the driving data along a road of the set place on the basis of the received driving data. Further, it is possible to travel in a desired direction using the handle 112.

That is, the user can experience as if he/she is actually traveling in the set virtual space through the image. Further, in order to implement a more realistic traveling image, the motion sensor 120 may sense the user's gaze and configure and display an image to correspond to the direction of the user's gaze.

Figure 3:
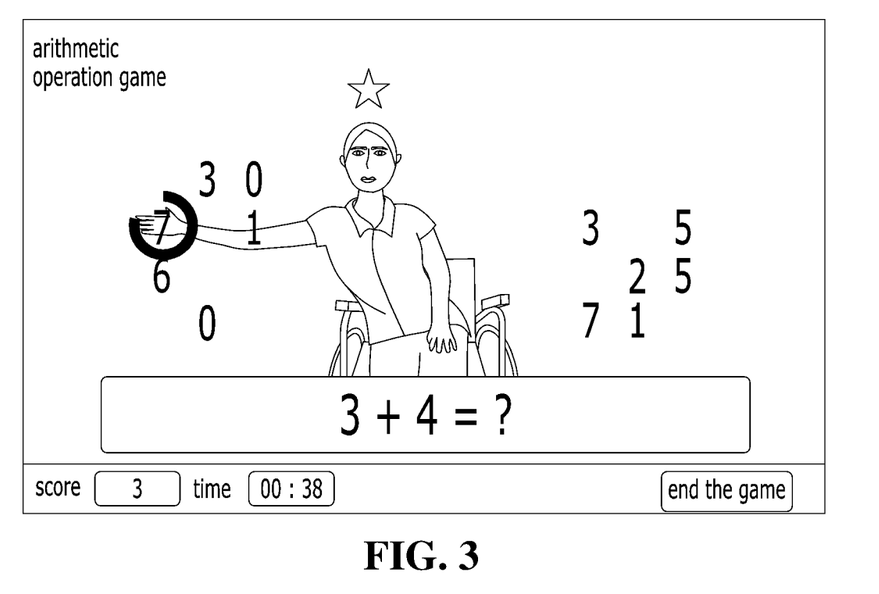
FIG. 3 is an embodiment when a cognition ability improvement game is executed in a cognition ability training unit of the present invention.

The cognition ability training unit 230 is described in more detail hereafter with reference to FIG. 3.

FIG. 3 is an embodiment when a cognition ability improvement game is executed in the cognition ability training unit 230 of the present invention.

The training unit 200 according to an embodiment of the present invention includes the cognition ability training unit 230 that can strengthen cognition ability through a calculation game and/or a puzzle game on the basis of motion data for movement of the user's hands and/or arms transmitted from the motion sensor 120, thus enables simultaneous training for improving muscle power of upper limbs and training for improving cognition ability. In more detail, the cognition ability training unit 230 can execute a cognition ability strengthening game on the basis of the motion data received through the communication unit 210. The motion data can include information about the lifted angles of the user's arms, the positions of the hands, and the speed of the hands moving to a specific position. That is, the motion data may include all of information about movement of the user's arms and hands such as whether the user's hands are positioned at accurate coordinates indicated on an image and the time consumed to move to the coordinates. Further, the cognition ability strengthening game may mean a calculation game, a puzzle game, and various games that can test cognition ability. That is, a crossword puzzle, a word guess game, etc. may also correspond to the cognition ability strengthening game.

The method of executing a cognition ability strengthening game is described in more detail with reference to FIG. 3. The cognition ability strengthening game is a content that the user hits the answers of questions displayed on an image using both arms. When playing the calculation game that is executed through the cognition ability training unit 230, the user can hit an answer by finding a number (ex. 7) corresponding to the correct answer of an arithmetic operation (ex. 3+4=?) indicated on an image and then putting a hand on the number. For example, when moving a number that is a correct answer of numbers on an image, as shown in FIG. 3, the user has to complete a yellow circle by putting a hand on the number and maintaining the posture. When a yellow circle is completed, the number can be moved with the hand. However, when the moved number is a wrong answer, the number automatically returns to the initial position. In this case, it may be possible to create training result data by measuring the degree of accuracy for the calculation value required in the game, the time consumed to hit the correct answer, and the degree of accuracy showing whether the user accurately puts his/her arm or hand on a corresponding number.

Figure 4A:
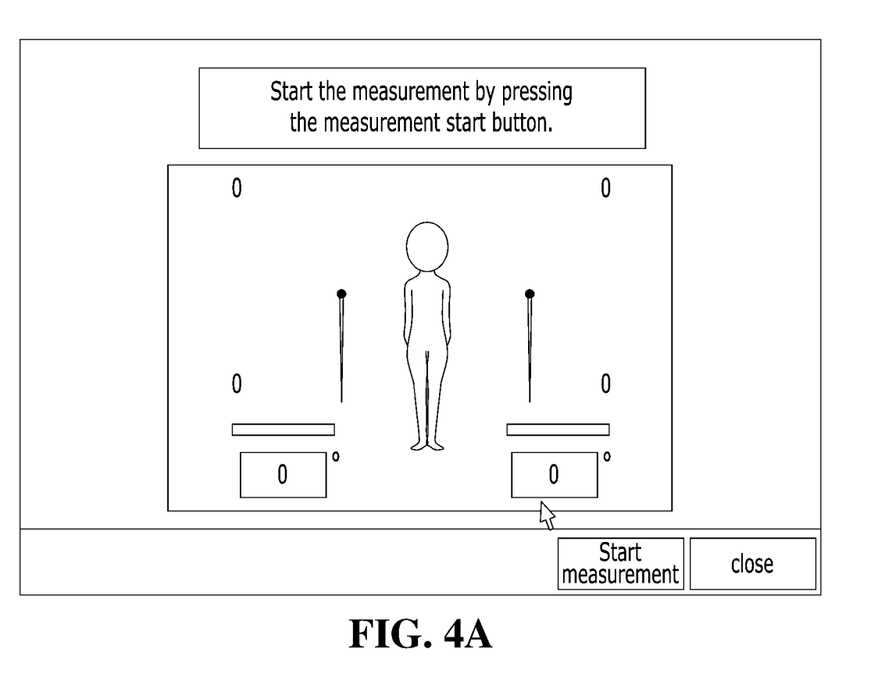
FIGS. 4A and 4B are exemplary views of evaluating the upper limb muscles of a rehabilitation patient in a rehabilitation evaluation unit of the present invention.
Figure 4B:
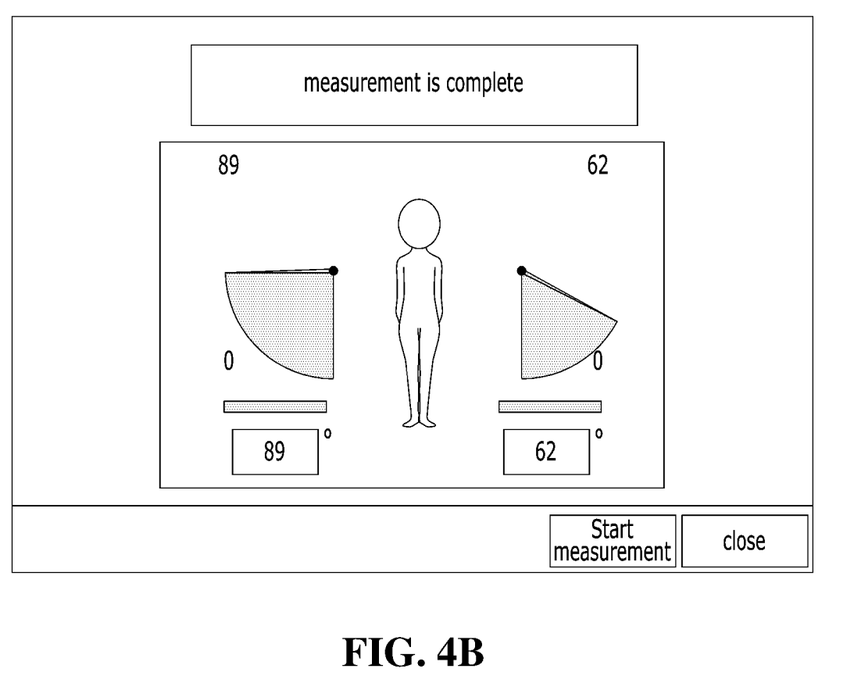

FIGS. 4A and 4B are exemplary views that estimate the upper limb muscles of a rehabilitation patient in a rehabilitation estimation unit 250 he present invention.

Referring to FIGS. 4A and 4B, the training unit 200 according to an embodiment of the present invention further includes the rehabilitation evaluation unit 250 and can evaluate the state of the user's upper limb muscles by sensing the maximum lifting angle of the user's arms through the motion sensor 120. For example, when the user lifts an arm and maintains the arm at a predetermined distance from the motion sensor 120 in an initial image before evaluation, as shown in FIG. 4A, the rehabilitation evaluation unit 250 can evaluate the state of the user's upper limb muscles on the basis of the sensed position information of the arm (ex. the angle of the arm), as shown in FIG. 4B. Further, the rehabilitation evaluation unit 250 can create data diagramming the data created by the rehabilitation evaluation unit 250 together with training result data created by the memory ability training unit 220 and the cognition ability training unit 230.

Hereafter, a training method using the training equipment 100 according to the present invention is described in more detail with reference to FIG. 5.

Figure 5:
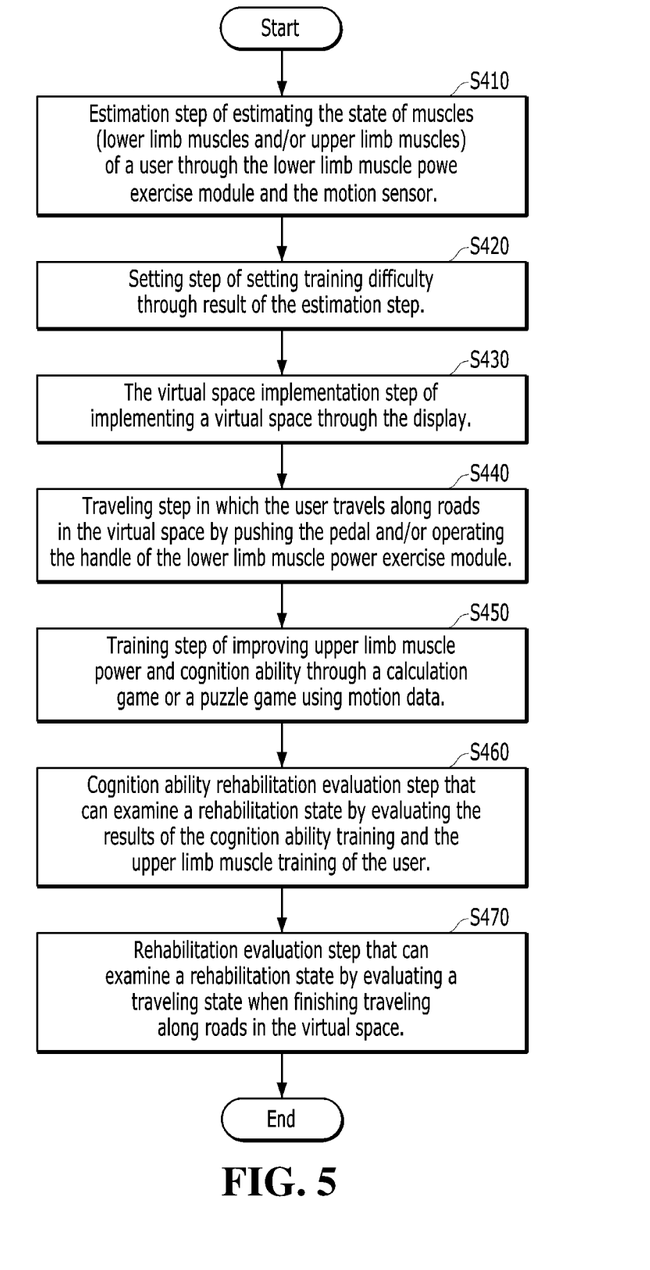
FIG. 5 is a flowchart showing a training method for improving the ability of memory, cognition, and muscle power of upper and lower limbs according to an embodiment of the present invention.

FIG. 5 is a flowchart showing steps of a training method using the training equipment 100 for improving the ability of memory, cognition, and muscle power of upper and lower limbs according to an embodiment of the present invention.

As shown in FIG. 5, the training method using the training equipment 100 according to the present invention includes an estimation step of estimating the state of muscles (lower limb muscles and/or upper limb muscles) of a user (S410), a difficulty setting step (S420), a virtual space implementation step (S430), a traveling step (S440), and a rehabilitation evaluation step (S450), whereby it is possible to provide a training method for improving ability of memory and cognition, and muscle power, the method being characterized by being able to complexly support memory ability training, lower limb muscle power exercise, and upper limb muscle power exercise of users such as rehabilitation patients, patients with dementia, and patients with cognitive impairment.

In more detail, the training method for improving ability of memory and cognition, and muscle power according to an embodiment of the present invention may include the estimation step (S410) of estimating the state of muscles (lower limb muscles and/or upper limb muscles) of a user through the lower limb muscle power exercise module 110 and the motion sensor 120. The user can measure the degree of the lower limb muscles by pushing the pedals 111 of the lower limb muscle power exercise module 110. Further, it is possible to estimate the state of the user's upper limb muscles by sensing the maximum lifting angle of the user's arm through the motion sensor 120.

Next, the training method for improving ability of memory and cognition, and muscle power may include the difficulty setting step (S420) of setting training difficulty through result of the estimation step. The speed and the driving time of the lower limb muscle power exercise module 110 can be set on the basis of the difficulty, and the lower limb muscle power exercise module 110 can control the rotational speed of the pedals 111 of the lower limb muscle power exercise module 110 through the load adjuster 113 when training is excessive in comparison to the state of the lower limb muscles and/or upper limb muscle power of the user.

The training method for improving ability of memory and cognition, and muscle power may include the virtual space implementation step (S430) of implementing a virtual space through the display 130. Further, the virtual space implementation step may further include a step in which the user sets a desired address to set a desired virtual space and a step of receiving a 3D map corresponding to the set address. However, as described above, the virtual space according to the present invention may be an actual or virtual (AR, VR, and MR) space and geometric information stored in advance in a space (or a device or a module) set in the training equipment 100 or received (through wire or wireless data communication) from an external geometric information service company.

Next, the training method for improving ability of memory and cognition, and muscle power may include the traveling step (S440) in which the user travels along roads in the virtual space by pushing the pedal 111 and/or operating the handle 111 of the lower limb muscle power exercise module 110. In the traveling, the distance and speed may be set in consideration of the state of the lower limb muscles according to the evaluation result of the rehabilitation evaluation unit 250, and the lower limb muscle power exercise module 110 can control the rotational speed of the pedals 111 of the lower limb muscle power exercise module 110 through the load adjuster 113 when training is excessive in comparison to the state of the lower limb muscles and/or upper limb muscle power of the user.

The traveling step (S440) of the training method for improving ability of memory and cognition, and muscle power according to an embodiment of the present invention may further include a training step (S450) of improving upper limb muscle power and cognition ability through a calculation game or a puzzle game using motion data sensed by the motion sensor 120. In more detail, a cognition ability improvement game quest such as a calculation game or a puzzle game may be executed at every predetermined distance while traveling along roads in the virtual space using the lower limb muscle power exercise module 110. Accordingly, when such a cognition ability improvement game quest is executed, the user can play an arithmetic operation game that is executed through the display 130.

Further, as shown in FIG. 5, the training method according to an embodiment of the present invention may further include a cognition ability rehabilitation evaluation step (S460) that can examine a rehabilitation state by evaluating the results of the cognition ability training and the upper limb muscle training of the user on the basis of the results of executing predetermined games such as the arithmetic operation game.

Next, the training method for improving ability of memory and cognition, and muscle power according to an embodiment of the present invention may further include a rehabilitation evaluation step (S470) that can examine a rehabilitation state by evaluating a traveling state when finishing traveling along roads in the virtual space.

As described above, the training equipment and the training method according to the present invention help various rehabilitation treatment and prevention of diseases such as dementia for users of the training equipment such as seniors, rehabilitation patients, patients with dementia, and patients with cognitive impairment, and it is possible to expect a recovery effect. In particular, the training equipment is one comprehensive system and can complexly support memory ability training, cognition ability improvement training, muscle power (lower limb muscle power and/or upper limb muscle power) exercise, and concentration ability training.

Although the present invention was described through preferred embodiments, those skilled in the art may change or modify the present invention in various ways within a range not departing from the spirit and scope of the present invention described in the following claims.

What is claimed is:

1. A training equipment comprising:
   a lower limb muscle power exercise module that includes pedals for driving and a handle for steering;
   a display configured to display images for a user to experience traveling in a virtual space for memory ability training of the user;
   a motion sensor configured to sense motions of the user; and
   a training unit comprising a controller configured to improve muscle power of the user on a basis of driving data of the lower limb muscle power exercise module,
   wherein the training unit is configured to evaluate a state of lower limb muscles of the user by measuring a degree of power pushing the pedals and to evaluate a state of upper limb muscles of the user by sensing a maximum lifting angle of the user's arms through the motion sensor, and
   wherein the training unit is configured to set a distance and a speed of the traveling based on the state of the lower limb muscles and to allow the lower limb muscle power exercise module to control a rotational speed of the pedals when training is determined to be excessive in comparison to the state of the lower limb muscles.

2. The training equipment of claim 1, wherein the training unit is configured to enable the memory ability training by allowing the user to experience the traveling in the virtual space implemented on the display on the basis of the driving data transmitted from the lower limb muscle power exercise module.

3. The training equipment of claim 2, wherein the training unit is configured to:
   control the display such that roads in the virtual space move forward by receiving a driving signal of the pedals from the lower limb muscle power exercise module,
   adjust a movement speed of the roads in the virtual space in accordance with the rotational speed of the pedals, and
   change a movement direction of the roads in the virtual space in accordance with an operational direction of the handle such that the user can experience as if the user is traveling along the roads in the virtual space by driving the lower limb muscle power exercise module.

4. The training equipment of claim 3, wherein the training unit is configured to receive the driving data including the rotational speed of the pedals and/or the operational direction of the handle and motion data of the user's hands and/or arms, and
   wherein lower limb muscle power improvement training and memory ability improvement training are simultaneously performed by allowing the user to travel along the roads in a virtual direction implemented on the display.

5. The training equipment of claim 1, wherein the training unit unit is configured to enable strengthening of cognition ability through a calculation game and/or a puzzle game on a basis of motion data of the user's hands and/or arms transmitted from the motion sensor.

* * * * *